(12) United States Patent
Okawa et al.

(10) Patent No.: US 7,342,946 B2
(45) Date of Patent: Mar. 11, 2008

(54) DEVICE FOR PROCESSING DATA SIGNALS, METHOD THEREOF, AND DEVICE FOR MULTIPLEXING DATA SIGNALS

(75) Inventors: Akira Okawa, Yokohama (JP); Toshio Kanayama, Yokohama (JP); Toshiaki Hayashi, Yokohama (JP); Kouji Mizumoto, Yokohama (JP); Hiroyuki Fukushima, Kawasaki (JP); Katsuichi Ohara, Yokohama (JP)

(73) Assignee: Fujitsu Limited, Kawasaki (JP)

( * ) Notice: Subject to any disclaimer, the term of this patent is extended or adjusted under 35 U.S.C. 154(b) by 850 days.

(21) Appl. No.: 10/073,570

(22) Filed: Feb. 11, 2002

(65) Prior Publication Data
US 2003/0043858 A1 Mar. 6, 2003

(30) Foreign Application Priority Data
Aug. 29, 2001 (JP) ............................. 2001-260407

(51) Int. Cl.
*H04J 3/04* (2006.01)
*H04J 3/16* (2006.01)

(52) U.S. Cl. ...................... 370/535; 370/465; 370/512; 370/537; 375/363

(58) Field of Classification Search ............... 370/505, 370/517, 532–539, 541, 335, 465–468, 542, 370/345, 543; 375/260, 372, 357, 363–365, 375/368
See application file for complete search history.

(56) References Cited

U.S. PATENT DOCUMENTS

| 3,680,051 | A | * | 7/1972 | Blessin et al. | 375/357 |
| 3,790,716 | A | * | 2/1974 | Herry et al. | 370/514 |
| 5,367,545 | A | * | 11/1994 | Yamashita et al. | 375/372 |
| 5,428,612 | A | * | 6/1995 | Scheffel et al. | 370/468 |
| 5,768,316 | A | * | 6/1998 | Sogo | 375/260 |
| 6,151,334 | A | * | 11/2000 | Kim et al. | 370/468 |
| 6,385,212 | B1 | * | 5/2002 | Baba et al. | 370/506 |
| 6,504,855 | B1 | * | 1/2003 | Matsunaga | 370/537 |
| 6,721,295 | B1 | * | 4/2004 | Brown | 370/335 |
| 6,874,048 | B2 | * | 3/2005 | Knapp et al. | 710/105 |

\* cited by examiner

*Primary Examiner*—Afsar Qureshi
(74) *Attorney, Agent, or Firm*—Katten Muchin Rosenman LLP

(57) ABSTRACT

In a device for processing data signals, a storing part stores an input signal and the data signals included in the input signal are extracted from the storing part and the data signals are output at a desired output speed. Then, the data signal is output based on storage information of the input signal.

6 Claims, 14 Drawing Sheets

FIG.10

| INPUT DATA | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|
| MIDDLE FIFO MEMORY | | | 3 | 4 | 5 | 6 | 7 | 8 | 9 | 10 | 11 | 12 | 13 | 14 | 15 | 16 |
| | | S103 2 | 2 | 3 | 4 | 5 | 6 | 7 | 8 | 9 | 10 | 11 | 12 | 13 | 14 | |
| | | ① 1 | 1 | 2 | 3 | 4 | 5 | 6 | 7 | 8 | 9 | 10 | 11 | 12 | 13 | |
| LAST FIFO MEMORY | 0 | 0 | 0 | 0 | 1 | 2 | 3 | 4 | 5 | 6 | 7 | 8 | 9 | 10 | 11 | 12 |
| | 0 | 0 | 0 | 0 | 0 | ① S104 | ② S105 | 3 | 4 | 5 | 6 | 7 | 8 | 9 | 10 | 11 |
| CIRCUIT INPUT | 1 | 1 | 1 | 1 | 1 | 0 | 0 | 0 | 0 | 0 | 0 | 0 | 0 | 0 | 0 | 0 |
| CIRCUIT OUTPUT | 0 | 0 | 0 | 0 | 0 | 0 | 1 | 1 | 1 | 1 | 1 | 1 | 1 | 1 | 1 | 1 |
| EMPTY | 1 | 1 | 1 | 0 | 0 | 0 | 0 | 0 | 0 | 0 | 0 | 0 | 0 | 0 | 0 | 0 |
| VALID DATA | 0 | 0 | 0 | 0 | 0 | 0 | 1 | 1 | 1 | 1 | 1 | 1 | 1 | 1 | 1 | 1 |

FIG.12

| INPUT DATA | 1 | 2 | 3 | 4 | | 5 | | | IC | 6 | 7 | 8 | | | 9 | | 10 | | 11 | | 12 | | 13 | |
|---|---|---|---|---|---|---|---|---|---|---|---|---|---|---|---|---|---|---|---|---|---|---|---|---|
| MIDDLE FIFO MEMORY | | | | | | | | | | | | | | | | | | | | | | | 13 | |
| | | | | | | | | | | | | | | | | | | | | | | 12 | 13 | |
| | | | | | | | | | | | | | | | | | | | | | 11 | 11 | 12 | 13 |
| | | | | | | | | | | | | | | | | | 10 | 10 | 11 | 12 | 12 | 12 |
| | | | | | | | | | | | | | | | | 9 | 9 | 10 | 11 | 11 | 11 |
| | | | | | 5 | | | | 8 | 7 | 8 | | | 9 | IC | IC | 9 | 10 | 10 | 10 |
| | | | | 4 | 4 | | | IC | IC | 6 | 7 | 8 | 8 | IC | 8 | 8 | 9 | IC | 9 |
| | | | 3 | 3 | 3 | | 5 | 5 | 5 | IC | 6 | 7 | 7 | 7 | 7 | 8 | IC | 9 |
| LAST FIFO MEMORY | | 2 | 2 | 2 | 2 | | 4 | 4 | 4 | 5 | IC | 6 | 6 | 6 | 6 | 7 | IC |
| | 1 | 1 | 1 | 1 | 1 | | 3 | 3 | 3 | 4 | 5 | IC | IC | IC | IC | IC |
| | 0 | 0 | 0 | 0 | 0 | | 2 | 2 | 2 | 3 | 4 | 5 | ⑤ | ⑥ | ⑦ | ⑧ | 9 |
| | 0 | 0 | 0 | 0 | 0 | | ① | 1 | 1 | 2 | 3 | 4 | 4 | 5 | 6 | 7 | 8 |
| CIRCUIT INPUT | | | | | | ⑤ | | ⓘ | | | | | ⓞ | ⓞ | | | ⓞ | | |
| CIRCUIT OUTPUT | 0 | 0 | 0 | 0 | | 0 | | 1 | | | | | 5 | 0 | 0 | 0 | 0 | | |
| | | | | | | S201 | S202 | S203 | | | | S204 | S205 | S206 | | | S207 | | |
| EMPTY | 1 | 1 | 1 | 1 | 1 | 0 | 0 | 1 | 1 | 1 | 1 | 1 | 1 | 1 | 1 | 0 | 1 | 1 | 1 | 1 | 1 | 1 |
| VALID DATA | 0 | 0 | 0 | 0 | 0 | 0 | 1 | 1 | 1 | 1 | 1 | 1 | 0 | 1 | 1 | 1 | 1 | 0 | 0 | 0 | 0 | 0 |

FIG.14

| INPUT DATA | 1 | 2 | 3 | 4 | 5 | IC | 6 | 7 | 8 | 9 | 10 | 11 | 12 | (IC) | IC | (IC) | 13 | 14 | 15 | 16 |
|---|---|---|---|---|---|---|---|---|---|---|---|---|---|---|---|---|---|---|---|---|
| FIRST FIFO MEMORY | | | | | | | | | | | | | | | | S303 S304 | | | | |
| MIDDLE FIFO MEMORY | | | | S301 ⑤ | IC | 6 IC | 7 6 | 8 7 | 9 8 | 10 9 | 11 10 9 | 12 11 10 | (IC) 12 11 | IC (IC) 12 | (IC) IC (IC) | (13) (IC) IC (IC) | 14 13 12 (IC) | 15 14 13 IC | 16 15 14 13 |
| LAST FIFO MEMORY | 1 | 2 1 | 3 2 1 | 4 3 2 1 | 4 3 2 1 | 5 4 3 2 | 5 4 3 2 | IC 5 4 3 | 6 IC 5 4 | 7 6 IC 5 | 8 7 6 IC | 8 7 6 IC | 9 8 7 6 | 10 9 8 7 | 11 10 9 8 | 12 11 10 9 | 12 11 10 9 | (IC) 12 11 10 | IC (IC) 12 11 | (IC) IC (IC) 12 |
| CIRCUIT INPUT | 0 | | 0 | 0 | 0 | 1 | | 2 | 3 | 4 | ⑤ | | IC | 6 | 7 | 8 | | 9 | 10 | 11 |
| CIRCUIT BUFFER | 0 | 0 | 0 | 0 | 0 | 0 | 1 | 1 | 2 | 3 | 4 | 5 | 5 | IC | 6 | 7 | 8 | 8 | 9 | 10 |
| CIRCUIT OUTPUT | 0 | | 0 | 0 | 0 | 0 | | 1 | 2 | 3 | 4 | | 5 | IC | 6 | 7 | | 8 | 9 | 10 |
| EMPTY | 0 | 1 | 1 | 1 | 1 | 0 | 0 | 0 | 0 | 0 | 0 | 0 | 0 | 0 | 0 | 0 | 0 | 0 | 0 | 0 |
| OVERFLOW | 0 | 0 | 0 | 0 | 0 | 0 | 0 | 0 | 0 | 0 | 0 | 0 | 0 | 0 | 0 | 0 | 1 | 1 | 1 | 1 |
| VALID DATA | 0 | 0 | 0 | 0 | 0 | 0 | 1 | 1 | 1 | 1 | 1 | 0 | 0 | 0 | 1 | 1 | 1 | 1 | 1 | 1 |
| HOLDING NO-DATA CODE | 1 | 1 | 1 | 1 | 1 | 1 | 0 | 0 | 0 | 0 | 0 | 0 | 1 | 0 | 0 | 0 | 0 | 0 | 0 | 0 |

| INPUT DATA | (IC) | IC | | 17 | | 18 | | 19 | 20 | 21 | | 22 | | 23 | | | 24 |
|---|---|---|---|---|---|---|---|---|---|---|---|---|---|---|---|---|---|
| FIRST FIFO MEMORY | | IC | | | | | | | | | | | | | | | |
| MIDDLE FIFO MEMORY | (IC) 16 15 14 | (IC) 16 15 14 | IC (IC) 16 15 | 17 IC (IC) 16 | 17 IC (IC) 16 | 18 17 IC (IC) | 18 17 IC | 19 18 17 | 20 19 18 | 21 20 19 18 | 21 20 19 | 22 21 20 | 22 21 20 | 23 22 21 | 23 22 21 | 23 22 | 24 23 22 |
| LAST FIFO MEMORY | 13 (IC) IC (IC) | 13 (IC) IC (IC) | 14 13 (IC) IC | 15 14 13 (IC) | 15 14 13 | 16 15 14 13 | 16 15 14 13 | (IC) 16 15 14 | IC (IC) 16 15 | IC (IC) 16 | 17 IC (IC) 16 | 17 IC (IC) | 18 17 IC IC | 18 17 IC IC | 19 18 17 | 20 19 18 | 21 20 19 18 |
| CIRCUIT INPUT | 12 | | (IC) (IC) | (IC) | | 13 | 14 | | 15 | | 16 | | (IC) | | IC | 17 | |
| CIRCUIT BUFFER | 11 | (12) | 12 (IC) | IC | IC | (IC) (IC) | 13 | 14 | 14 | 15 | 15 | 16 | 16 | (IC) | (IC) | IC | 17 |
| CIRCUIT OUTPUT | 11 | | 12 | | IC | | 13 | | 14 | | 15 | | 16 | | | IC | |
| | | | | DL | | DL | | | | | | | | DL | | | |
| EMPTY | 0 | 0 | 0 | 0 | 0 | 0 | 0 | 0 | 0 | 0 | 0 | 0 | 0 | 0 | 0 | 0 | 0 |
| OVERFLOW | 0 | 0 | 0 | 0 | 0 | 0 | 0 | 0 | 0 | 0 | 1 | 0 | 1 | 0 | 1 | 0 | 0 |
| VALID DATA | 0 | 0 | 0 | 0 | 0 | 0 | 0 | 1 | 1 | 1 | 1 | 0 | 0 | 0 | 0 | 0 | 0 |
| HOLDING NO-DATA CODE | 0 | 0 | 0 | (1) | 1 | (1) | (1) | 0 | 0 | 0 | 0 | 0 | 0 | (1) | (1) | 1 | 0 |

S305 / S307
S306  S308

S309

DEVICE FOR PROCESSING DATA SIGNALS, METHOD THEREOF, AND DEVICE FOR MULTIPLEXING DATA SIGNALS

BACKGROUND OF THE INVENTION

1. Field of the Invention

The present invention generally relates to a device for processing data signals, a method thereof, and a device for multiplexing data signals.

2. Description of the Related Art

As shown in FIG. 1, an N:1 asynchronous data signal multiplexing device 9 multiplexes data signals, which are output from N numbers of interfaces $4_1, 4_2, \ldots, 4_n$ via signal lines 402, at an N:1 multiplexing circuit 3 and outputs an output data signal via a signal line 302.

Each of the interfaces $4_1, 4_2, \ldots, 4_n$ in FIG. 1 stores a data signal for each of input data signals #1, #2, ..., #n via signal lines 401 in a FIFO (First-In First-Out) memory 41 and an extracting circuit 42 extracts the data signal from the FIFO memory 41. Then, the data signals are output into the N:1 multiplexing circuit 3 via the signal lines 402. The N:1 multiplexing circuit 3 multiplexes the data signal output from the N numbers of the interfaces $4_1, 4_2, \ldots, 4_n$ and then outputs output data multiplexing the data signals via the signal line 302 and an output FP indicating a start of a time-division-multiplex period via a signal line 303.

As a process example in the N:1 asynchronous data signal multiplexing device 9, a case of outputting the data signals via the signal lines 402 from three interfaces $4_1, 4_2$, and $4_3$ is illustrated in FIG. 2. In FIG. 2, a numbered square represents each data signal processed in the three interfaces $4_1, 4_2$, and $4_3$. Also, the numbered squares are numbered in an input order. In this example, a data flow of the interface $4_1$ begins from a data signal 1, a data flow of the interface $4_2$ begins from a data signal 21, and a data flow of the interface $4_3$ begins from a data signal 41. Each of the data signals is represented by using a numeral n indicated in the numbered squares.

In FIG. 2, data signals 1 through 4 are input each time the interface $4_1$ outputs the output FP via the signal line 303 from the N:1 multiplexing circuit 3. Similarly to the interface $4_1$, four data signals are input in each of the interfaces $4_2$ and $4_3$. Each of the four data signals is output by synchronizing with a synchronous clock 301 from each of the interfaces $4_1, 4_2$, and $4_3$. The N:1 multiplexing circuit 3 multiplexes the data signals output from each of the interfaces $4_1, 4_2$, and $4_3$, and outputs the output data carried by multiplexed data signals and the output FP.

Each input speed of inputting input data signals #1, #2, ..., #n via respective signal lines 401 may be faster or slower than a clock speed of the synchronous clock 301 for sending the three data signals from the FIFO memory 41 to the N:1 multiplexing circuit 3. In this case, as shown in FIG. 2, four data signals are not always input to each of the interfaces $4_1, 4_2$, and $4_3$ every time the output FP is output via the signal line 302. That is, for example, five data signals may be input in a case of a faster input speed, or three data signals may be input in a case of a slower input speed.

For example, in a case in which only three data signals are input every time the output FP is output such as the interface $4_3$ in FIG. 3, since the input speed of the FIFO memory 41 in FIG. 1 is faster than a clock speed for sending the three data signals from the FIFO memory 41 to the N:1 multiplexing circuit 3, the FIFO memory 41 becomes to lack the data signals. As a result, the FIFO memory 41 has nothing to send to the N:1 multiplexing circuit 3. Thus, one data signal is missing and cannot be output (failure of output data) in the N:1 multiplexing circuit 3.

On the other hand, in a case in which the input speed of inputting the data signals in the interface $4_3$ is faster so that five data signals are input each time the output FP is output, since the input speed in the interface $4_3$ is faster than the clock speed for sending the three data signals from the FIFO memory 41 to the N:1 multiplexing circuit 3, the FIFO memory 41 is saturated and the data signal overflows. Consequently, a slip phenomena occurs so that for example, a data signal 45 and a data signal 50 are not accumulated in the FIFO memory 41 and are therefore lost (cancellation of data signal).

In a time-division-multiplexing method in a conventional multiplexing device such as the N:1 asynchronous data signal multiplexing device 9, when there is a difference between the input speed of inputting the input data signal #1 via the signal lines 401 and the clock speed for sending the three data signals from the FIFO memory 41 to the N:1 multiplexing circuit 3, a data signal may be lost when the data signal is input and overflows, or a data signal may be missing when the data signal is to be multiplexed with other data signals.

SUMMARY OF THE INVENTION

It is a general object of the present invention to provide a device for processing data signals, a method thereof, and a device for multiplexing synchronized data signals in which the above-mentioned problems are eliminated.

A more specific object of the present invention is to provide the device for processing data signals, a method thereof, and the device for multiplexing synchronized data signals, which can overcome a difference between an input speed of an input data signal and a clock speed of a synchronous clock, and output the data signals.

The above object of the present invention is achieved by a device for processing data signals, including: a storing part storing an input signal; and an extracting part extracting the data signals included in the input signal from the storing part and outputting the data signals at a desired output speed, wherein the extracting part outputs the data signals based on storage information of the input signal. Accordingly, in the device for processing data signals, based on the storage information of the storing part storing the input data signal, the extracting part can recognizes a difference between the input speed of the input signal and a speed of a synchronous clock. Therefore, it is possible for the extracting part to output the data signal in which the input signal from the storing part is processed in correspondence with the difference.

Moreover, in the device for processing data signals, the storing part may include a first memory part, a second memory part, and a third memory part; the input signal is stored in an order of the first memory part, the second memory part, and the third memory part; and the second memory part notifies the extracting part of the storage information of the second memory part. Accordingly, by dividing the storing part into three divisions, it is possible for the extracting part to recognize an accumulation state required in an entire storing part by accumulation information of the second memory part. In addition, by changing a capacity of each of the first, the second, and the third memories, it is possible to determine a time difference between a failure of an output data signal and a cancellation of an input signal.

Furthermore, the above object of the present invention is achieved by a device for multiplexing data signals, including a multiplexing part multiplexing data signals output from a plurality of signal processing parts and outputting a multiplexed data signal, wherein each of the plurality of signal processing parts comprises: a storing part storing an input signal; and an extracting part extracting data signals included in the input signal from the storing part and outputting the data signals at a desired output speed, wherein the extracting part outputs the data signals based on a storage information of the input signal. Accordingly, in the device for multiplexing data signals, since the multiplexing part is provided to multiplex the data signals output from the plurality of signal processing parts, the device for multiplexing data signals includes features of the signal processing parts as described above.

Alternatively, the above object of the present invention is achieved by a method for processing data signals included in an input data signal to output at a desired output speed, the method including the steps of: outputting the data signals in which an invalid data signal is inserted, at the desired output speed, when an input speed of the input data signal is slower than the desired output speed, outputting the data signals in which the invalid data signal included in the data signals is deleted, at the desire output speed, when the input speed is faster than the desired output speed. Accordingly, in the method for processing data signals, the invalid data signal is inserted into the input data signal so as to prevent the failure of the output data signal. And the invalid data signal included in the input data signal is deleted so as to output a valid data signal with priority.

BRIEF DESCRIPTION OF THE DRAWINGS

Other objects, features, and advantages of the present invention will become more apparent from the following detailed description when read in conjunction with the accompanying drawings, in which:

FIG. 10 is a diagram illustrating memory states in data flows of the data signals in the FIFO memories in the first case;

FIG. 12 is a diagram illustrating memory states in data flows of the data signals in the FIFO memories in the second case;

FIG. 14 is a diagram illustrating memory states in data flows of the data signals in the FIFO memories in the third case.

DESCRIPTION OF THE PREFERRED EMBODIMENTS

Figure 1:
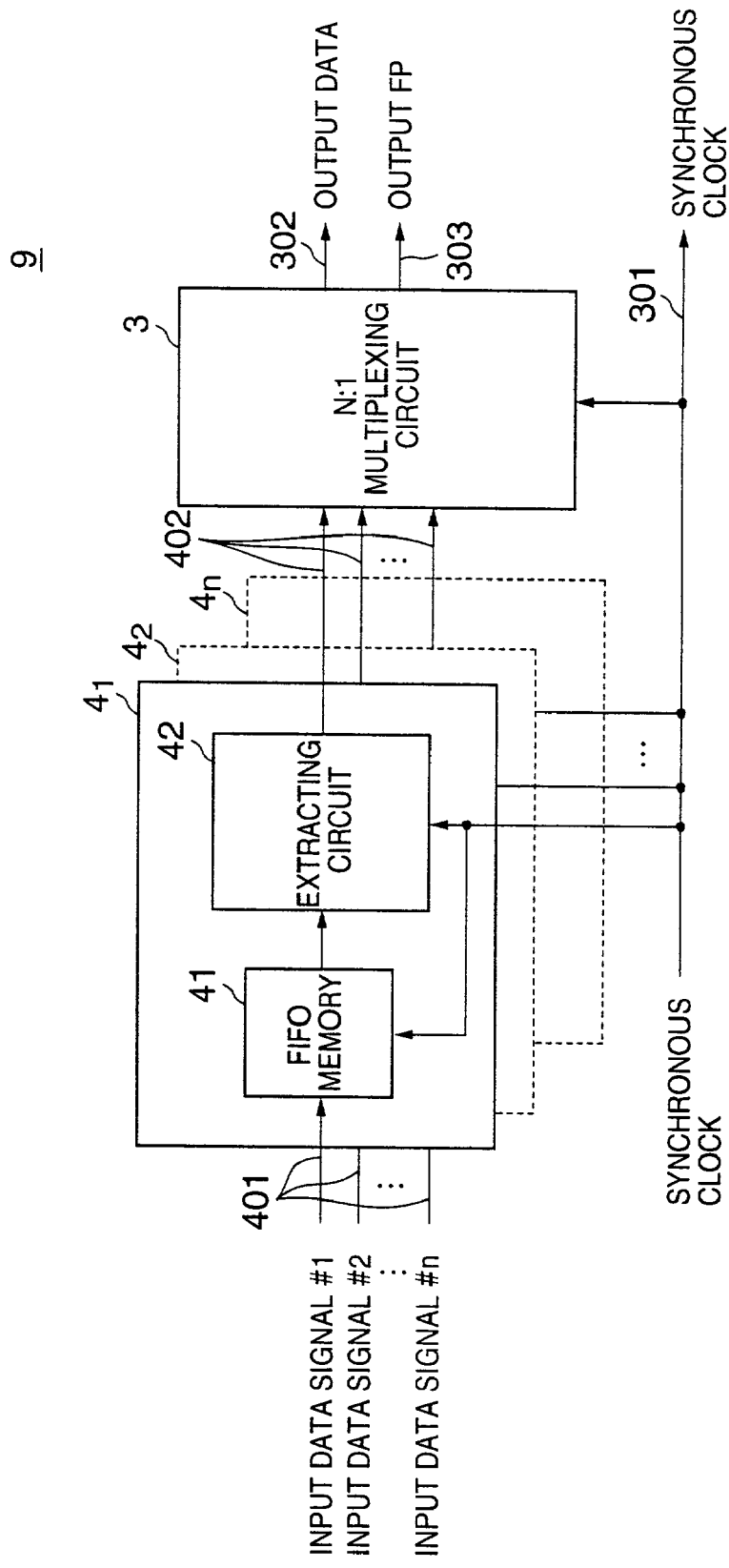
FIG. 1 is a schematic block diagram showing an N:1 asynchronous data signal multiplexing device.
Figure 2:
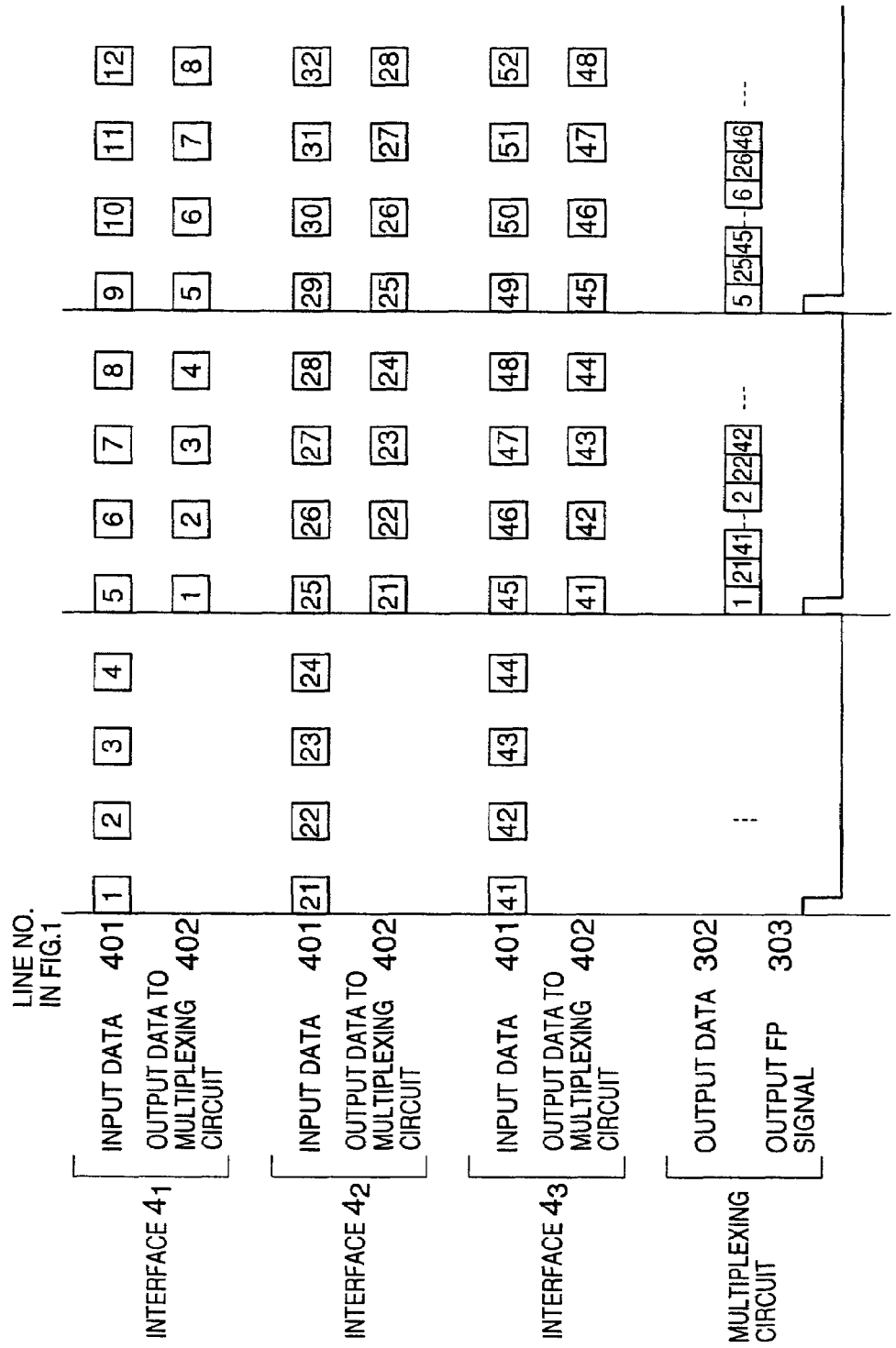
FIG. 2 is a diagram showing a case of outputting data signals from three interfaces provided in the N:1 asynchronous data signal multiplexing device.
Figure 3:
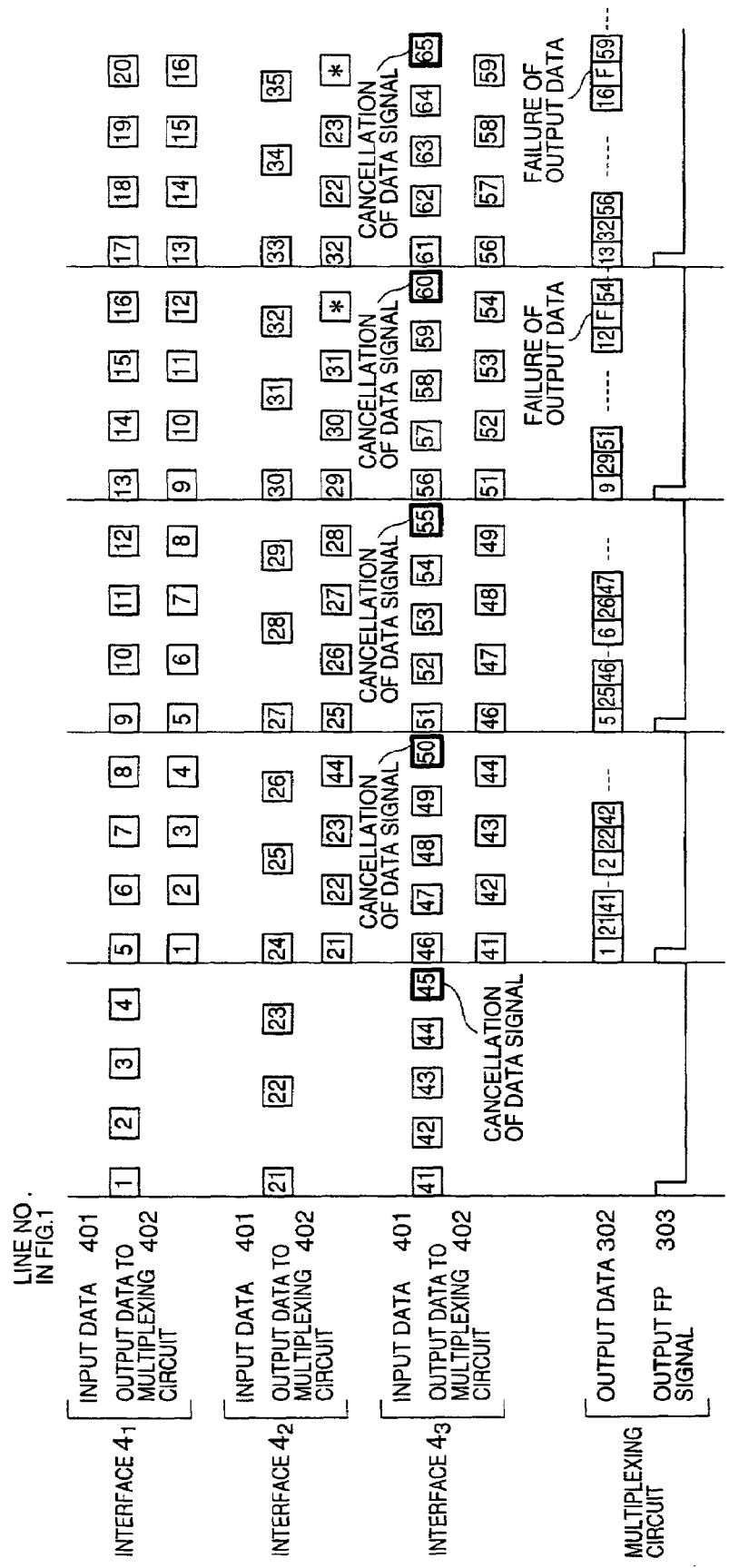
FIG. 3 is a diagram illustrating a process example in the N:1 asynchronous data signal multiplexing device.

A data signal processing device and a multiplexing device will now be described with reference to figures, according to an embodiment of the present invention.

First, data signals, which are consecutively input to the data signal processing device for input data signals #1, #2, ..., #n, will be described. Each of the data signals has the same data length as an invalid data code that will be described later. Also, the data signal does not always include valid data only and may include invalid data. Therefore, in order to identify the valid data signal or the invalid data signal, a code showing that the valid data starts is additionally provided at a beginning of the valid data, and also a code showing that the valid data ends is additionally provided at an end of the valid data.

Next, an entire configuration of the multiplexing device according to the embodiment of the present invention will be described with reference to FIG. 4. A multiplexing device 10 includes a plurality of input interfaces $501_1, 501_2, \ldots, 501_n$ and an N:1 multiplexing circuit 3. The input data signals #1, #2, ..., #n are asynchronously input to the input interfaces $501_1, 501_2, \ldots, 501_n$, via signal lines 101, and the input interfaces $501_1, 501_2, \ldots, 501_n$ output the data signals to the N:1 multiplexing circuit 3 with reference to a synchronous clock 301 of the N:1 multiplexing circuit 3. Then, the N:1 multiplexing circuit 3 multiplexes data signals input through signal lines 202 for all of the input interfaces $501_1, 501_2, \ldots, 501_n$, and outputs output data via a signal line 302 and an output FP via a signal line 303 from the multiplexing device 10.

The input interfaces $501_1, 501_2, \ldots, 501_n$, will now be described. Each of the input interfaces $501_1, 501_2, \ldots, 501_n$ includes a FIFO memory part 100 having three FIFO memories: a first FIFO memory 11, a middle FIFO memory 12, and a last FIFO memory 13, and an extracting/correcting circuit 502.

The FIFO memory part 100 is used to store the input data signal #1. From the data signal output from the FIFO memory part 100 via a signal line 201, the extracting/correcting circuit 502 extracts the data signal to be output to the N:1 multiplexing circuit 3. It should be noted that the input data signal #1 includes a plurality of data signals (referred later as data signal 1, 2, 3, ... ).

Next, the FIFO memory part 100 will now be described. The FIFO memory part 100 provided in each of the input interfaces $501_1, 501_2, \ldots, 501_n$ is used to store each of the input data signals #1, #2, ..., #n as described above. For the sake of convenience, the input interface $501_1$ and the input data signal #1 are referred to in order to explain a storing method for storing the plurality of data signals in respective FIFO memory parts 100 provided in the input interfaces $501_1, 501_2, \ldots, 501_n$.

As described above, the FIFO memory part 100 includes three FIFO memories, that is, the first FIFO memory 11, the middle FIFO memory 12, and the last FIFO memory 13. The data signals are consecutively stored in the FIFO memory part 100 in an order of an arrangement of the first FIFO memory 11, the middle FIFO memory 12, and the last FIFO memory 13 via signal lines 111 and 121. In detail, when the data signals are to be stored in a state in which all of the first FIFO memory 11, the middle FIFO memory 12, and the last FIFO memory 13 are empty, the data signals are stored in the last FIFO memory 13. When the last FIFO memory 13 is saturated, the data signals are also stored in the middle FIFO memory 12. Consequently, when the middle FIFO memory 12 is saturated, the data signals are also stored in the first FIFO memory 11.

In the storing method, in an empty state in which there is no data signal in the middle FIF0 memory 12, it is determined that the FIFO memory part 100 has a sufficient empty memory capacity. On the other hand, when the middle FIFO memory 12 is saturated, it is determined that the FIFO memory part 100 has insufficient empty memory capacity.

Regarding a capacity of the FIFO memory part 100 storing the data signals, it is possible to indirectly recognize a difference between an input timing of the data signals and an output timing of the data signal output to the N:1 multiplexing circuit 3. However, the FIFO memory part 100 sends capacity information indicating a capacity state of the middle FIFO memory 12 to the extracting/correcting circuit 502.

In addition, by changing a capacity of the last FIFO memory 13, it is possible to determine a time difference between a state in which the middle FIFO memory 12 becomes empty and a state in which the data signal cannot be output since the valid data signal is consecutively stored and thus a correction is not conducted for an input delay time. Moreover, by changing a capacity of the first FIFO memory 11, it is possible to determine a time difference between a state in which middle FIFO memory 12 becomes empty and a state in which a cancellation of the data signal occurs since the valid data signal is consecutively stored and thus a correction is not conducted for an input overflow.

A process conducted by the extracting/correcting circuit 502 will now be described and then details of a configuration of the extracting/correcting circuit 502 will be described.

When the extracting/correcting circuit 502 is notified that the middle FIFO memory 12 is empty, the extracting/ correcting circuit 502 determines that an input speed of inputting the input data signal #1 is slower than an output speed of outputting the data signal via the signal line 202 to the N:1 multiplexing circuit 3. Thus, in order to prevent a failure of the data signal to be output to the N:1 multiplexing circuit 3, a no-data code is provided between a set of valid data and a next set of valid data.

On the other hand, when the extracting/correcting circuit 502 is notified that the middle FIFO memory 12 has no empty capacity, the extracting/correcting circuit 502 determines that the input speed of inputting the input data signal #1 is faster than the output speed of outputting the data signal via the signal line 202 to the N:1 multiplexing circuit 3. Thus, when the invalid data is included in the data signal to be output to the N:1 multiplexing circuit 3, the invalid data is deleted in the input interface $501_1$ and the valid data is output to the N:$_1$ multiplexing circuit 3 with priority.

As described above, the input interface 11 determines an input speed of inputting the data signal 1 based on an empty state of the FIFO memory 100 and the extracting/correcting circuit 502 deletes the invalid data or inserts the no-data code.

The extracting/correcting circuit 502 will now be described in further detail. FIG. 4 is a diagram showing a schematic circuit configuration of the multiplexing device according to the present invention.

Figure 4:
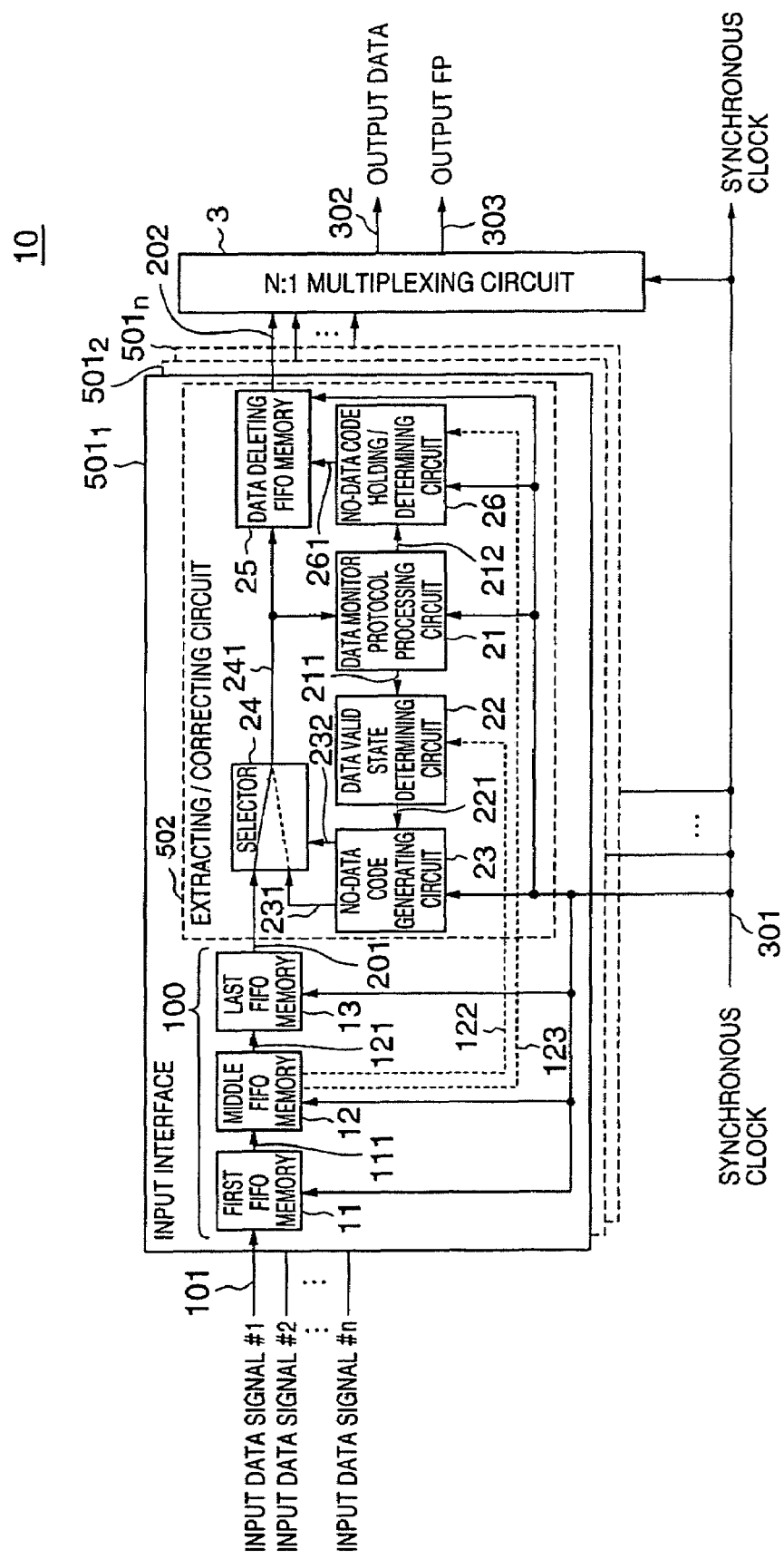
FIG. 4 is a diagram showing a schematic circuit configuration of a multiplexing device according to the present invention.

As shown in FIG. 4, the extracting/correcting circuit 502 includes a selector 24, a data monitor protocol processing circuit 21, a data valid state determining circuit 22, a no-data code generating circuit 23, a no-data code holding/determining circuit 26, and a data deleting FIFO memory 25.

The data monitor protocol processing circuit 21 monitors the validity of each data signal output from the selector 24 and signals the data valid state determining circuit 22 or the no-data code holding/determining circuit 26 of a monitoring result via a signal line 211 or 212, respectively.

The data valid state determining circuit 22 signals the no-data code generating circuit 23 to generate the no-data code via the signal line 221. Also, the data valid state determining circuit 22 is notified of a state of a memory capacity of the middle FIFO memory 12, by the middle FIFO memory 12 via a signal line 122.

The no-data code generating circuit 23 is notified by the data valid state determining circuit 22 and then generates the no-data code as well as sends an instruction (described later) to the selector 24 via a signal line 232.

The selector 24 selectively switches to the no-data code generating circuit 23 or the FIFO memory 100 in order to provides a data signal output to a signal line 241. The selector 24 switches based on instructions from the data valid state determining circuit 22.

The no-data code holding/determining circuit 26 signals the data deleting FIFO memory 25 to delete the data signal stored in the data deleting FIFO memory 25. Also, the no-data code holding/determining circuit 26 is notified of the state of the memory capacity by the middle FIFO memory 12 via signal line 123.

Each of the circuits 21, 22, 23, 24, 25, and 26 provided in the extracting/correcting circuit 502 synchronizes with the synchronous clock 301.

Figure 5:
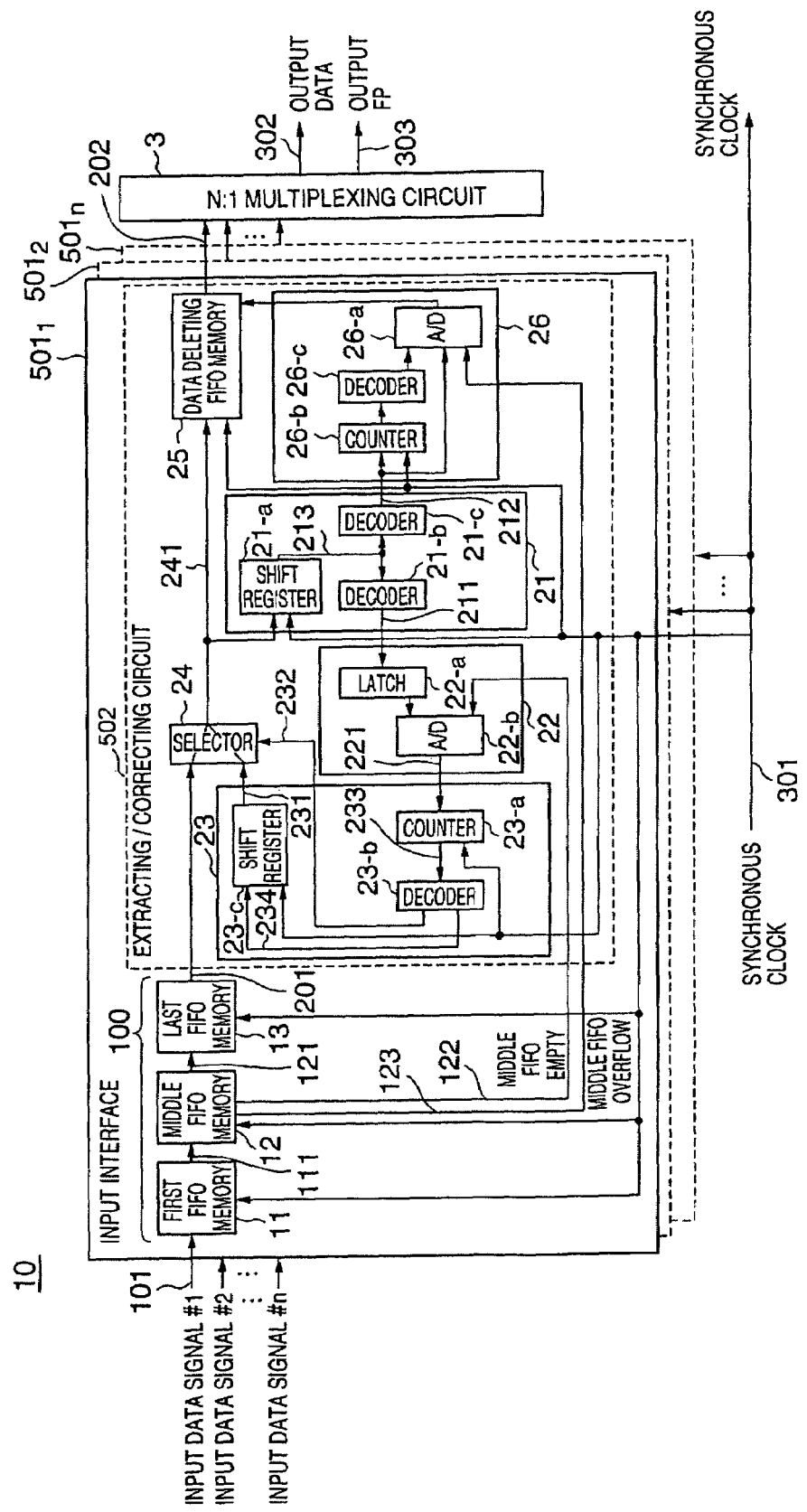
FIG. 5 is a diagram showing details of each circuit provided in an extracting/correcting circuit, according to the embodiment of the present invention.

Each circuit provided in the extracting/correcting circuit 502 will now be described with reference to FIG. 5 in detail. FIG. 5 is a diagram showing details of each circuit provided in the extracting/correcting circuit, according to the embodiment of the present invention.

The data monitor protocol processing circuit 21 includes a shift register 21-$a$, and two decoders 21-$b$ and 21-$c$. When the decoder 21-$b$ detects a start code indicating a start of the valid data signal or an end code of the valid data signal from the data signal via a signal line 213 from the shift register 21-$a$, the decoder 21-$b$ notifies the data valid state determining circuit 22 via a signal line 211 that the start code or the end code is detected. When the decoder 21-$c$ detects the no-data code from the data signal via the signal line 213 from the shift register 21-$a$, the decoder 21-$c$ notifies the no-data holding/determining circuit 26 that the no-data code is detected.

The data valid state determining circuit 22 includes a latch 22-$a$, an AND circuit 22-$b$, and a shift register 23-$c$. The latch 22-$a$ holds a valid data state or an invalid data state of the data signal, in which the valid state or the invalid state is notified from the data monitor protocol processing circuit 21 via the signal line 211. The AND circuit 22-$b$ is notified of the empty state from the middle FIFO memory 12 via the signal line 122 and also signals the no-data code generating circuit 23 to generate the no-data code when the invalid data state is held in the latch 22-$a$. The AND circuit 22-$b$ receives the valid data state or the invalid data state via a signal line 222.

The no-data code generating circuit 23 includes a counter 23-$a$, a decoder 23-$b$, and a shift register 23-$c$. The counter 23-*a* receives the notice of generating the no-data code, from the data valid state determining circuit 22, and then increments a counter value from 0 (zero) to the same bit length as the no-data code by synchronizing the synchronous clock 301. The decoder 23-*b* continues to signal the shift register 23-*c* via a signal line 234 of a transmission of the no-data code until the counter value of the counter 23-*a* becomes the same value as the bit length of the no-data code while receiving the counter value from the counter 23-*a* via a signal line 233. The decoder 23-*b* also signals the selector 24 via a signal line 232 to switch to a signal line 231. When the shift register 23-*c* receives a notice from the decoder 23-*b*, and then sends the no-data code to the selector 24 by synchronizing with the synchronous clock 301.

The selector 24 outputs the sequence of the data signals input from the last FIFO memory 13 via the signal line 201 to the data deleting FIFO memory 25 and the data monitor protocol processing circuit 21. Also, when the selector 24 receives a notice of switching from the no-data code generating circuit 23, the selector 24 switches to the signal line 231 in order to input the data signal and outputs the no-data code, which is output from the no-data code generating circuit 23, to the data deleting FIFO memory 25 and the data monitor protocol processing circuit 21.

The data deleting FIFO memory 25 stores the data signal output from the selector 24 and outputs to the N:1 multiplexing circuit 3.

The no-data code holding/determining circuit 26 includes a counter 26-*b*, an AND circuit 26-*a*, and a decoder 26-*c*. The counter 26-*b* increments a counter value every one bit unit which is processed to delete the no-data code. Also, the AND circuit 26-*a* signals the data deleting FIFO memory 25 via a signal line 261 to delete the data signal when the AND circuit 26-*a* is notified from the data monitor protocol processing circuit 21 that the no-data code is detected, the decoder 26-*c* outputs the notice, which is received via a signal line 262, via a signal line 263, and the AND circuit 26-*a* is notified of a saturation state from the middle FIFO memory 12.

The no-data code holding/determining circuit 26 notifies the data deleting FIFO memory 25 of a deletion of the no-data code. However, the no-data code holding/determining circuit 26 is made not to consecutively notify of the deletion of the no-data code. That is, when two no-data codes are successive, a first no-data code is deleted but a second no-data code is not deleted.

To do so, when the counter 26-*b* receives a detection notice of the no-data code from the data monitor protocol processing circuit 21, the counter 26-*b* increments the counter value by synchronizing with the synchronous clock 301 until the counter value becomes twice a value of the bit length of the no-data code.

When the counter value is 1 or more and is the bit length of the no-data code or less, the data monitor protocol processing circuit 21 instructs to delete the no-data code. When the counter value is greater than the bit length of the no-data code and is twice the bit length of the no-data code, the data monitor protocol processing circuit 21 does not instruct to delete the no-data code. Thus, the no-data code is not consecutively deleted.

Figure 6:
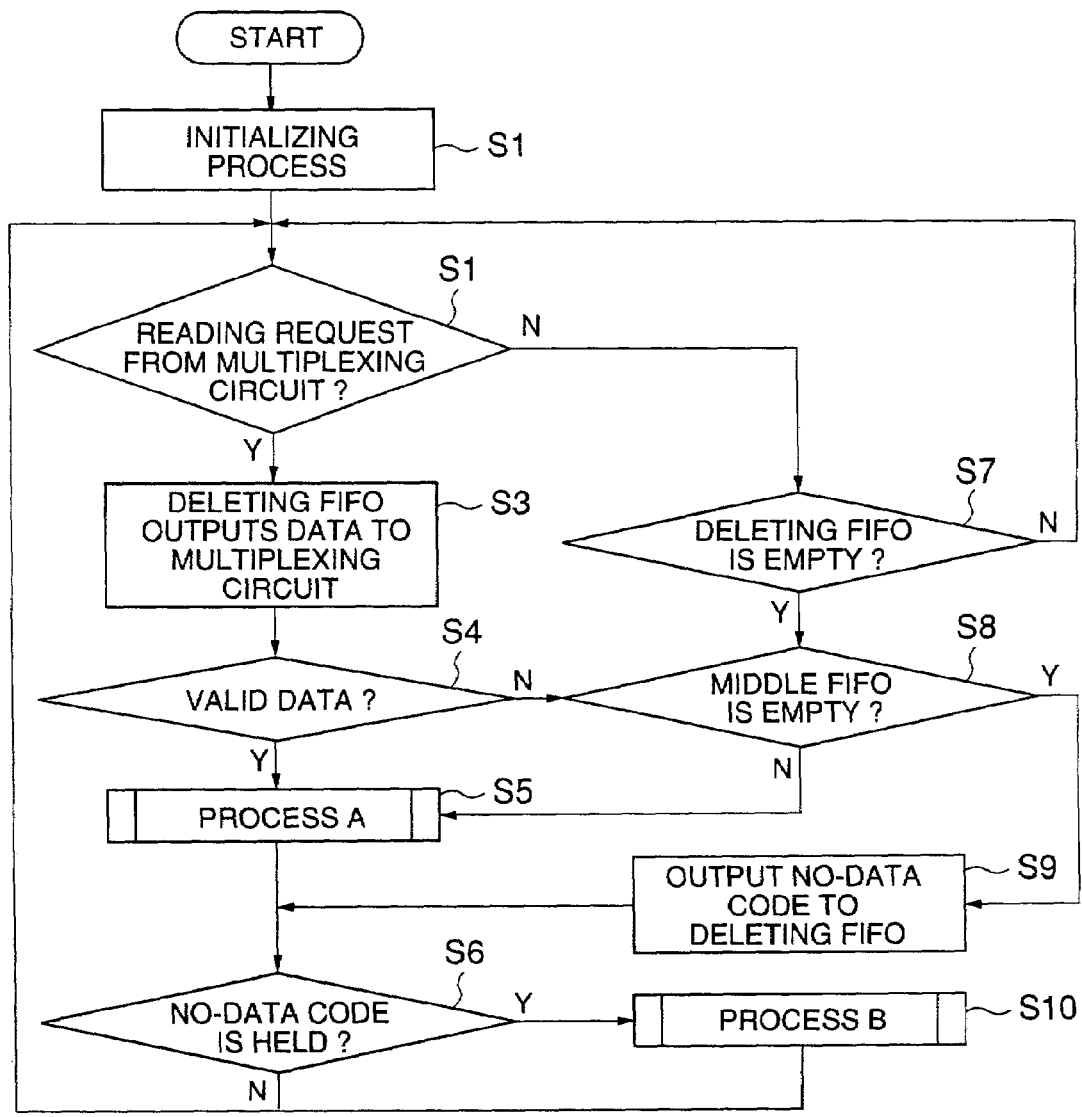
FIG. 6 is a schematic flowchart for explaining the process of an input interface according to the present invention.

The description of the configuration of the input interface $501_1$ is completed. A process in the input interface $501_1$ will now be described with reference to FIG. 6. FIG. 6 is a schematic flowchart for explaining the process of the input interface $501_1$ according to the present invention. In the flowchart of FIG. 6, "deleting FIFO" denotes the data deleting FIFO memory 25, "middle FIFO" denotes the middle FIFO memory 12, and "multiplexing circuit" denotes the N:1 multiplexing circuit 3.

When the process is activated, "data invalid" is set to the data valid state determining circuit 22, and then an initializing process is conducted for the data deleting FIFO memory 25 to set the no-data code (step S1).

After the initializing process, the input interface $501_1$ determines whether or not there is a reading request for reading the data signal from the N:1 multiplexing circuit 3 (step S2).

First, it is assumed that the data valid state determining circuit 22 shows "valid data" and the no-data code holding/determining circuit 26 does not hold the no-data code, and the following steps will be explained.

When the input interface $501_1$, receives the reading request (Y in the step S2), the data deletion FIFO memory 25 outputs the data signal via the signal line 202 to the N:1 multiplexing circuit 3 (step S3). Since the data valid state determining circuit 22 shows "data valid" (Y in the step S4), a process A is executed (step S5) Subsequently, it is determined that the no-data code is not held (N in step S6) and then the process of the input interface $501_1$ goes back to the step S2.

Figure 7:
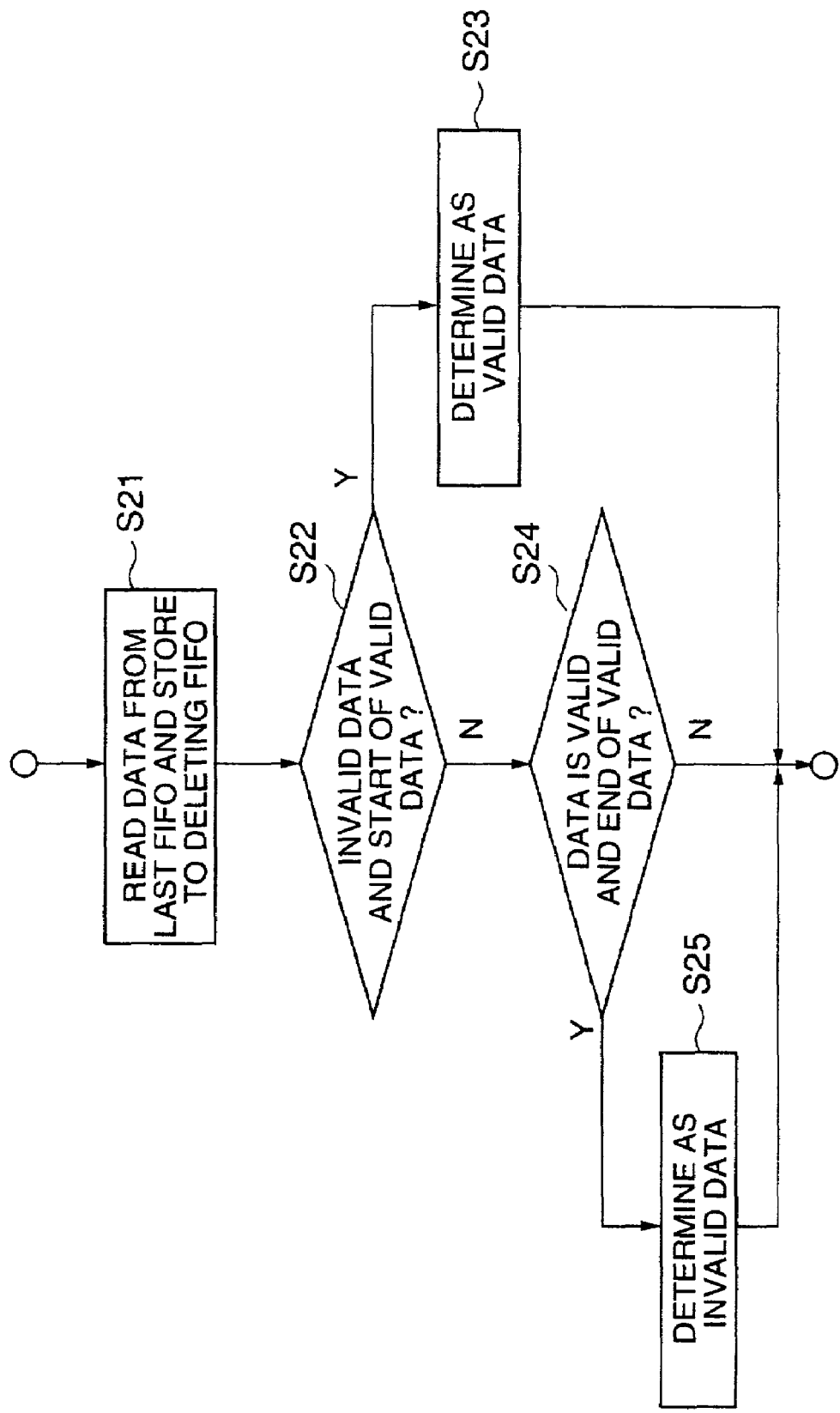
FIG. 7 is a flowchart for explaining a process A according to the present invention.

The process A will now be described with reference to a flowchart of FIG. 7. FIG. 7 is a flowchart for explaining the process A according to the present invention. In FIG. 7, "last FIFO" denotes the last FIFO memory 13.

In the process A, mainly, the data valid state of the data valid state determining circuit 22 is updated if necessary.

The data signal is read from the last FIFO memory 13 and stored in the data deleting FIFO memory 25 (step S21). When the data signal includes the start code indicating a start of the valid data and the data valid state determining circuit 22 shows the data invalid state (Y in step S22), the data valid state determining circuit 22 changes to the data valid state (step S23).

When the end code indicating the data signal read from the last FIFO memory 13 includes the end of the valid data and the data valid state determining circuit 22 shows the valid data state (N in the step S22 and then Y in step S24), the data valid state determining circuit 22 changes the data valid state to the data invalid state (step S25).

Next, the process A will now be described in a state in which the data valid state determining circuit 22 shows the data invalid state and the no-data code holding/determining circuit 26 holds the no-data code.

The steps S1, S2, S3, and S4 are conducted as described above. In this case, since it is determined that the data is invalid (N in the step S4), it is determined whether or not the middle FIFO memory 12 is empty. When it is determined that the middle FIFO memory 12 is not empty (N in the step S8), the step S5 and step S6 are executed as described above. On the other hand, when it is determined that the middle FIFO memory 12 is empty (Y in the step S8), the no-data code is output to the data deleting FIFO memory 25 (step S9) since it is indicated that the input speed is slower. After that, the step S6 is executed.

Next, the process A will now be described in a state in which the no-data code is held (Y in the step S6). The no-data code holding/determining circuit 26 holds the no-data code in a case in which the no-data code holding/determining circuit 26 is notified from the data monitor protocol processing circuit 21 that the no-data code is detected.

Figure 8:
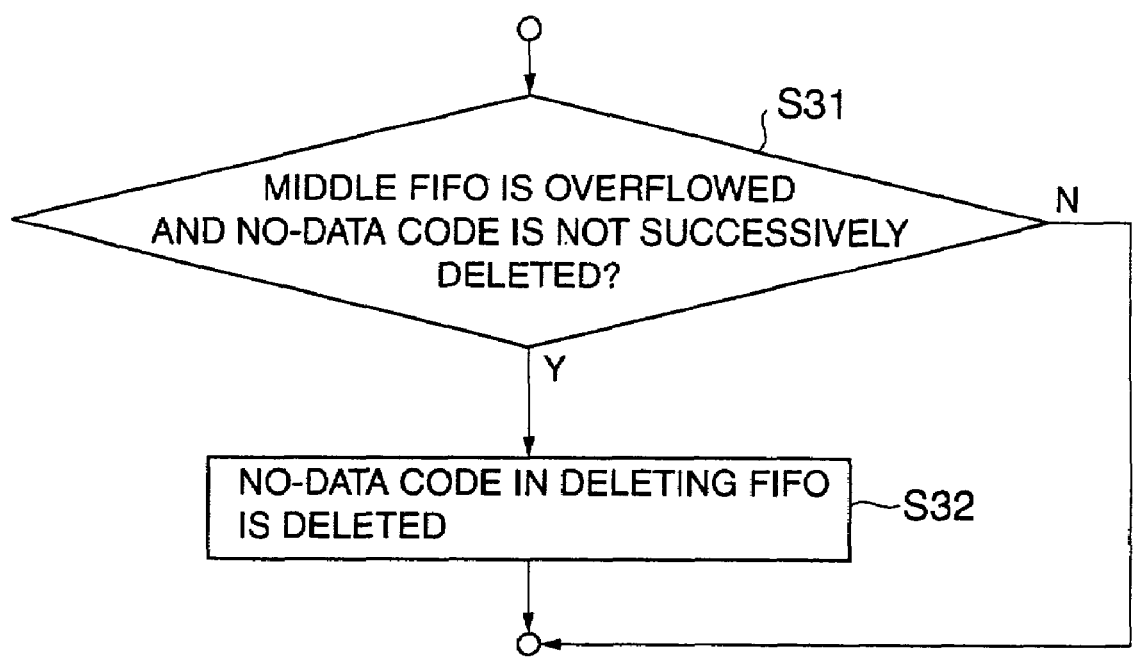
FIG. 8 is a flowchart for explaining a process B according to the present invention.

In this case, a process B (step S10) is activated. The process B will now be described with reference to FIG. 8.

When it is determined that the no-data code is held, the middle FIFO memory 12 is overflowing, and the no-data code is not successively deleted (Y in step S31), the no-data code of the data deleting FIFO memory 25 is deleted (step S32) since the input speed of inputting the data signal 1 is faster.

Next, the process A will now be described with reference to FIG. 6 in a state in which there is no reading request from the N:1 multiplexing circuit 3 (N in the step S2).

In this case, when the data deleting FIFO memory 25 is empty (Y in step S7), the step S8 is executed. On the other hand, when the data deleting FIFO memory 25 is not empty (N in the step S7), the input interface $501_1$ remains in a waiting state of waiting for the reading request from the N:1 multiplexing circuit 3 since the data signal to be output to the N:1 multiplexing circuit 3 is stored in the data deleting FIFO memory 25. Thus, the process of the input interface $501_1$ goes back to the step S2.

As described above, the schematic explanation of the process of the input interface $501_1$ is completed. The process of the input interface $501_1$ will now be described in three cases with reference to respective timing charts.

In a first case, the middle FIFO memory 12 is not empty and not saturated. The process of the input interface $501_1$ will now be described with reference to FIG. 9 and FIG. 10.

Figure 9:
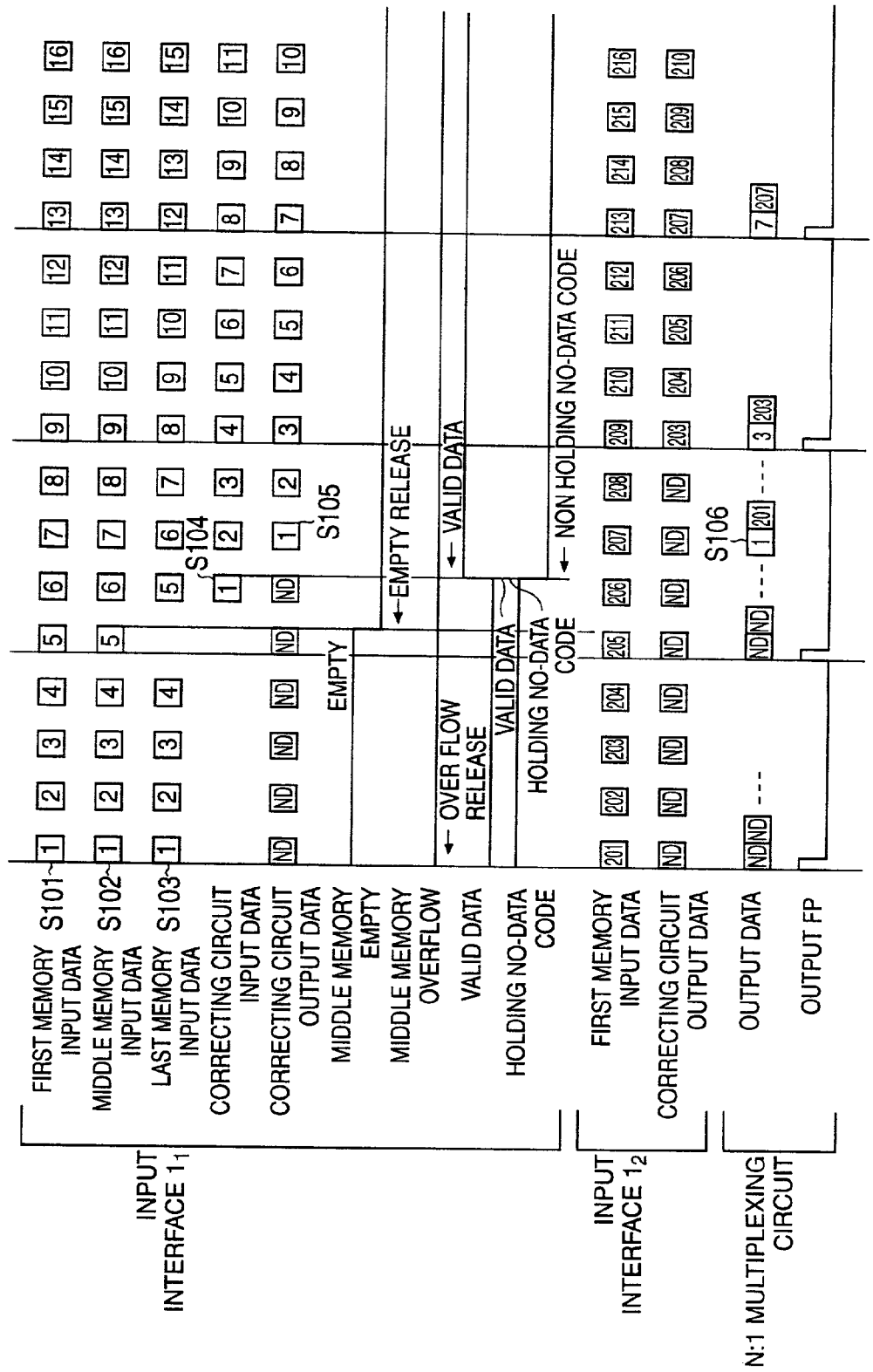
FIG. 9 is a diagram illustrating a time chart for data flows of outputting data signals from the interfaces to an N:1 multiplexing circuit in a first case.

FIG. 9 is a diagram illustrating a time chart for data flows of outputting the data signals from the input interfaces $501_1$ and $501_2$ to the N:1 multiplexing circuit 3 in the first case.

In FIG. 9, each square block with a numeral represents one data signal. The numeral is numbered in order of inputting a sequence of the data signals. The numeral starts from "1" in the input interface $501_1$ and the numeral starts from "201" in the input interface $501_2$. Hereinafter, each data signal, which is represented by the square, is shown by using a numeral n (n=1, 2, . . . , n) shown in the square such as a data signal n (n=1, 2, . . . , n). And, a square in which "ND" is denoted represents the no-data code.

Next, terminologies in FIG. 9 will be explained.

"FIRST MEMORY INPUT DATA", "MIDDLE MEMORY INPUT DATA", and "LAST MEMORY INPUT DATA" show data flows of the data signal input to the first FIFO memory 11, the data signal input to the middle FIFO memory 12, and the data signal, respectively.

"CORRECTING CIRCUIT INPUT DATA" shows a data flow of the data signal input to the extracting/correcting circuit 502 and "CORRECTING CIRCUIT OUTPUT DATA" shows a data flow of the data signal output from the extracting/correcting circuit 502.

"MIDDLE MEMORY EMPTY" indicates whether or not the middle FIFO memory 12 is empty. "MIDDLE MEMORY OVERFLOW" indicates whether or not the middle FIFO memory 12 is saturated.

"VALID DATA" shows whether or not the data signal input to the extracting/correcting circuit 502 are valid. And "HOLDING NO-DATA CODE" shows whether or not the no-data code holding/determining circuit 26 receives the detection notice of the no-data code from the data monitor protocol processing circuit 21 and holds the no-data code.

For the sake of convenience, regarding the input interface $501_2$, "FIRST MEMORY INPUT DATA" (the data flow of the sequence of the data signal input to the first FIFO memory 11) and "CORRECTING CIRCUIT OUTPUT DATA" (the data flow of the sequence of the data signals output from the extracting/correcting circuit 502) are shown and the others that are the same as the ones in the input interface $501_1$ are omitted.

"OUTPUT DATA" of the N:1 multiplexing circuit 2 shows a data flow of the sequence of the data signals output from the N:1 multiplexing circuit 2 and "OUTPUT FP" shows a start of a multiplexed data signal.

Next, an example of the data flow will now be described in detail with reference to FIG. 9 by using the data signal 1 carrying the sequence of the data signals to the input interface $501_1$. In FIG. 9, the data signal 1 is input to the first FIFO memory 11 (step S101), passes through the middle FIFO memory 12 (step S102), and then is stored in the last FIFO memory 13 (step S103). As described above, even if all of the FIFO memories 11, 12, and 13 are empty, the data signal 1 is stored in order of the first FIFO memory 11, the middle FIFO memory 12, and the last FIFO memory 13.

Subsequently, the data signal 1 carrying the sequence of the data signals is input to the extracting/correcting circuit 502 (step S104), is processed in the extracting/correcting circuit 502, and then is output to the N:1 multiplexing circuit 3 (step S105). Then, the data signal 1 is output by the N:1 multiplexing circuit 3 (step S106).

FIG. 10 is a diagram illustrating memory states in data flows of the data signals in the FIFO memories in the first case. Terminologies in FIG. 10 will now be explained.

In "INPUT DATA", "MIDDLE FIFO MEMORY", and "LAST FIFO MEMORY", the numerals of the data signals, which are input to the input interface $501_1$, are shown. And 0 (zero) denotes the no-data code. Also, in "CIRCUIT INPUT", the numerals of the data signals, which are input to the extracting/correcting circuit 502, are shown. In "CIRCUIT OUTPUT", the numerals of the data signals, which are output from the extracting/correcting circuit 502, are shown. In this case, 0 (zero) denotes the no-data code.

An "EMPTY" shows whether or not the middle FIFO memory 12 is empty. "EMPTY" shows "1" when the middle FIFO memory 12 is empty and "EMPTY" shows "0" when the empty state is released. "VALID DATA" shows whether or not the data signal input to the extracting/correcting circuit 502 is valid data. "VALID DATA" shows "1" when the data signal is valid and "VALID DATA" shows "0" when the data signal is invalid.

In the first case, the first FIFO memory 11 is not shown since the data signals are not stored in the first FIFO memory 11.

In FIG. 10, the data flow of the data signal 1 will be described by corresponding to the data flow explained in the FIG. 9. In steps S101 through S103 in FIG. 9, the data signal 1 is stored in the last FIFO memory 13 (step S103). Subsequently, the data signal 1 is input to the extracting/correcting circuit 502. The extracting/correcting circuit 502 outputs the data signal 1 (step S105).

It should be noted that the diagram in FIG. 9 sequentially expresses the data flow while the diagram in FIG. 10 dispersedly expresses the data flow.

Referring to FIG. 9 and FIG. 10, the process of the multiplexing device 10 will be described in the first case.

In FIG. 10, a data signal 5 is a first data signal to be stored to the middle FIFO memory 12. Thus, before the data signal 5 is stored in the middle FIFO memory 12, "EMPTY" shows "1" indicating the empty state. Also, in FIG. 9, "MIDDLE MEMORY EMPTY" shows the empty state. When the data signal 5 is input in the empty state, the empty state is released and an empty release signal indicating a termination of the empty state is signaled from the middle FIFO memory 12 to the data valid state determining circuit 22.

The data signal 1 is input to the extracting/correcting circuit 502 simultaneously when a data signal 6 is stored in the middle FIFO memory 12. In this case, since the start code indicating a start of the valid data is additionally provided to the data signal 1, data monitor protocol processing circuit 21 recognizes that the data is valid and then signals the data valid state determining circuit 22 that the data is valid. Thus, "VALID DATA" in FIG. 9 shows that the data is valid and "HOLDING NO-DATA CODE" in FIG. 9 shows a state of non-holding a no-data code. In FIG. 10, when the data signal 1 is input to the extracting/correcting circuit 502 (step S104), it is not determined that the data is valid. However, when the data signal 1 is output from the extracting/correcting circuit 502 (step S105), "VALID DATA" shows "1" indicating the validity of the data.

Then, the data signal 1 is output from the input interface $501_1$, and the data signal 1 is output from the N:1 multiplexing circuit 3 as well as data signal output from the input interface $501_2$ (step S106 in FIG. 9).

After that, the middle FIFO memory 12 maintains a state which is not the empty state and not the saturation state. Regarding to following data signals after the data signal 1, since successive valid data is input, "VALID DATA" and "HOLDING NO-DATA CODE" have not been changed.

The explanation is hereby completed for the process in the first case in which the middle FIFO memory 12 is not empty and not saturated.

A second case in which the input speed of inputting the data signal is slower will now be described with reference to FIG. 11 and FIG. 12.

In the second case, the no-data code is additionally provided to the data signal when the data signal is input in the input interface $501_1$. "ND" in a square represents the no-data code in FIG. 11 and "IC" in FIG. 12 indicates that the no-data is detected as the invalid data code.

Figure 11:
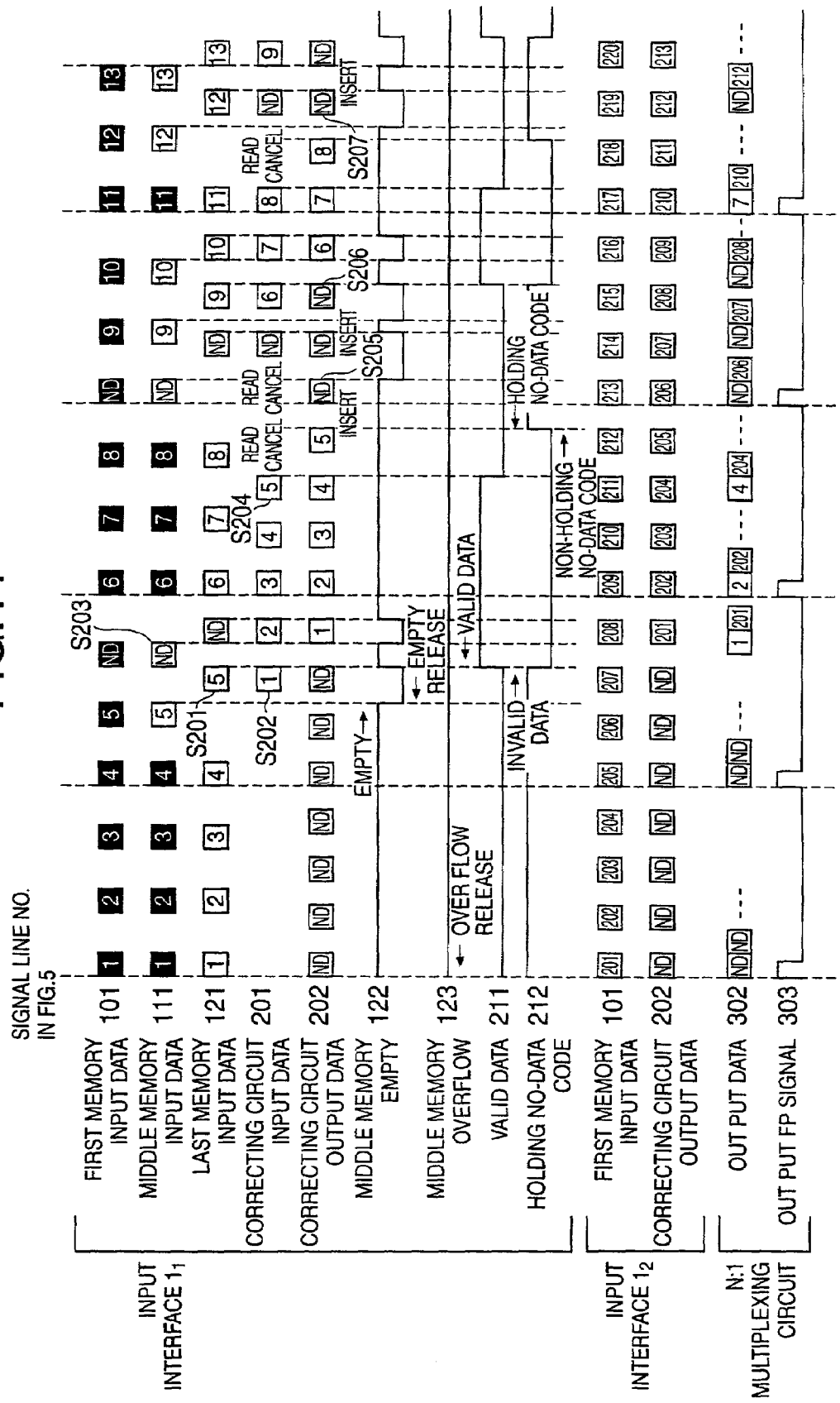
FIG. 11 is a diagram illustrating a time chart for data flows of outputting the data signals from the interfaces to the N:1 multiplexing circuit in a second case.

FIG. 11 can be referred to as the same as FIG. 9 and also FIG. 12 can be referred to as the same as FIG. 10.

The second case will now be described. The same processes as the first case are conducted until the data signal 5 is input to the input interface $501_1$. Referring to FIG. 11 and FIG. 12, since the data signal 5 is stored from the middle FIFO memory 12 to the last FIFO memory 13 (step S201), the middle FIFO memory 12 becomes empty. In FIG. 11, "MIDDLE MEMORY EMPTY" changes from "Empty RELEASE" to "Empty" again. In FIG. 12, "EMPTY" becomes "0 (zero)". In addition, "VALID DATA" shows "VALID DATA" in FIG. 11 because of the data signal 1. In FIG. 11, "VALID DATA" shows the valid data and "HOLDING NO-DATA CODE" shows the non-holding no-data code (step S202).

Therefore, the no-data code is input in the middle FIFO memory 12 (step S203). In FIG. 11, "MIDDLE MEMORY EMPTY" changes from "Empty" to "Empty RELEASE" again. In FIG. 12, "EMPTY" becomes "0 (zero)". However, after that, the middle FIFO memory 12 becomes empty again. And the empty state of the middle FIFO memory 12 is signaled to the data valid state determining circuit 22.

Subsequently, the data signal 5, which is a last data signal for the valid data following the data signal 1, is input to the extracting/correcting circuit 502 (step S204). As described above, since the end code showing the end of the valid data is provided to the data signal 5, the data monitor protocol processing circuit 21 signals the data valid state determining circuit 22 of the invalidity of the data, and the data valid state determining circuit 22 is set to the data invalid state. Accordingly, "VALID DATA" in FIG. 11 shows "INVALID DATA".

After the data signal 5 is output from the extracting/correcting circuit 502, the data valid state determining circuit 22 instructs the no-data code generating circuit 23 to output the no-data code and then the no-data code generating circuit 23 switches the selector 24 to the signal line 231. Thus, the no-data code is inserted after the data signal 5 and is output from the extracting/correcting circuit 502 (step S205). Since the middle FIFO memory 12 maintains the empty state at a time of outputting the no-data code in the step S205, the no-data code is inserted again and is output (step S206).

Similarly, in a case of data signal 8, the no-data code is inserted (step S207) since the middle FIFO memory 12 maintains the empty state.

As described above, if the middle FIFO memory 12 is in the empty state and the data is invalid, it is possible to prevent the failure of the output data by inserting the no-data code.

A third case will now be described in which the input speed of inputting the data signal is faster, with reference to FIG. 13 and FIG. 14.

In the third case, the no-data code is inserted when the data signal is input to the input interface $501_1$. "ND" shown in a square in FIG. 13 represents the no-data code and "IC" in FIG. 14 indicates that the no-data is detected as the invalid data code. In the third case, there is a case in which the no-data code is deleted. "(IC)" in FIG. 14 represents the no-data code to be deleted. Also, since the input speed of inputting the data signal is faster, the middle FIFO memory 12 is overflowing. "MIDDLE MEMORY OVERFLOW" in FIG. 13 shows the overflow state and "OVERFLOW" in FIG. 14 shows the overflow state.

Figure 13:
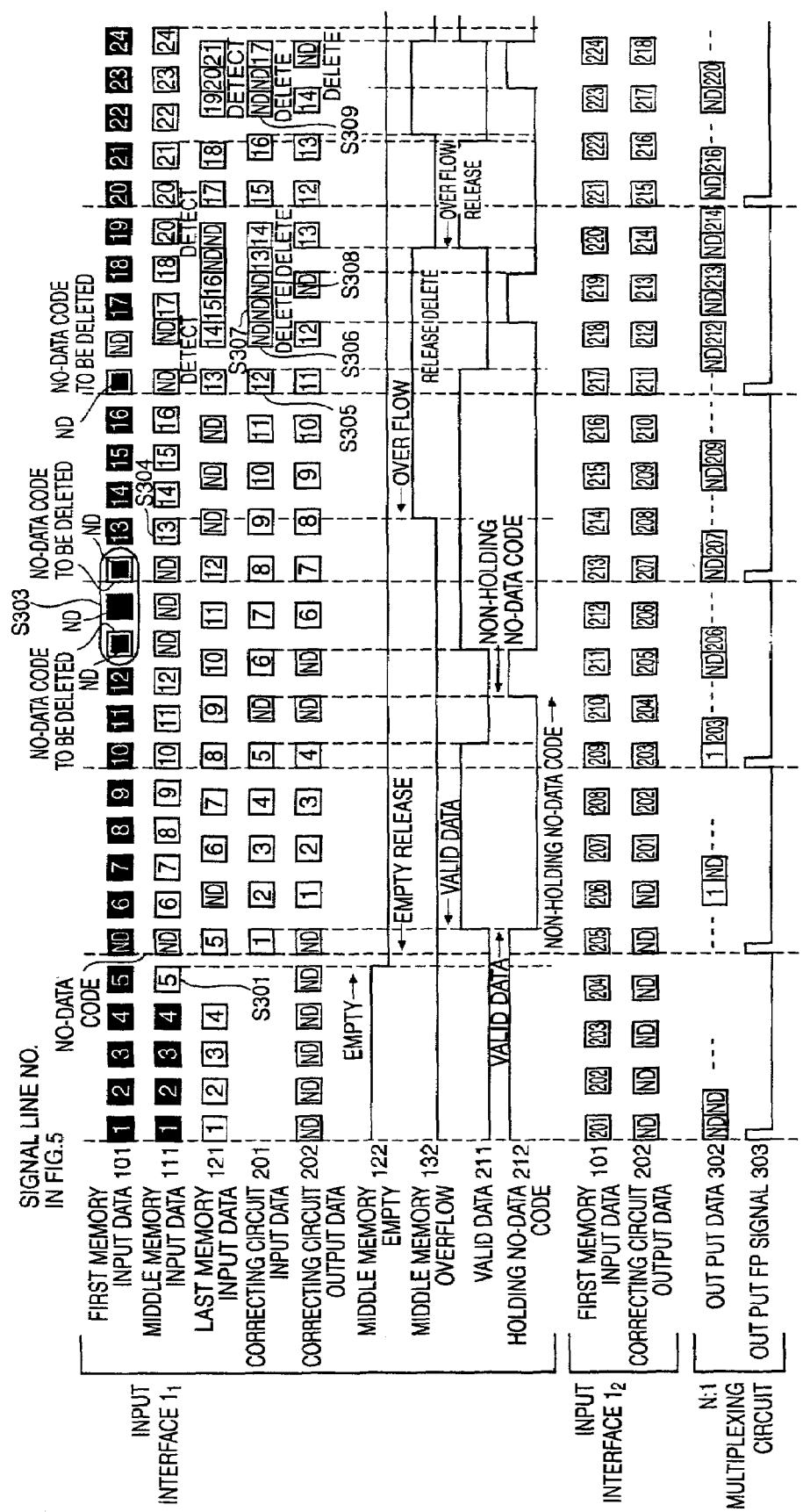
FIG. 13 is a diagram illustrating a time chart for data flows of outputting the data signals from the interfaces to the N:1 multiplexing circuit in a third case.

FIG. 13 can be referred to as the same as FIG. 9 and also FIG. 14 can be referred to as the same as FIG. 10.

A process in the third case will now be described. The same processes in the first case are conducted until the data signal 5 is input. When the data signal 5 is input, the middle FIFO memory 12 becomes no longer empty (step S301) and then the middle FIFO memory 12 signals the data valid state determining circuit 22 of the empty release signal. After that, the middle FIFO memory 12 will not be empty in the third case.

Subsequently, the data signal 5, which is the last data signal of the data signals consecutively following the data signal 1, is input to the extracting/correcting circuit 502 (step S202). In the third case different from the second case, since the middle FIFO memory 12 is not empty, the no-data code is not inserted. After a data signal 12, three successive no-data codes are input (step S303). Two of the three successive no-data codes are to be deleted.

When a data signal 13 is stored in the middle FIFO memory 12, the middle FIFO memory 12 is saturated and then the saturation state is signaled to the no-data code holding/determining circuit 26. In addition, "MIDDLE MEMORY OVERFLOW" shows "Overflow" in FIG. 13 and "OVERFLOW" shows "1" indicating the saturation state. When the data signal 12 is input to the extracting/correcting circuit 502, "VALID DATA" changes to "INVALID DATA" (step S202). Referring to FIG. 14, "VALID DATA" becomes "0" indicating "INVALID DATA". And then the no-data code is input to the extracting/correcting circuit 502. In this state, since the middle FIFO memory 12 is saturated and the data is the no-data code, the no-data code is deleted (step S306).

Similarly, in a next state, the middle FIFO memory 12 is saturated and the input data is the no-data code. However, this no-data code is not deleted so as not to delete successive no-data codes (step S307).

A following data is deleted since the middle FIFO memory 12 is saturated, the input data is the no-data code, and the successive no-data codes are not to be deleted (step S308). After that, the no-data code is deleted in a condition described above.

As described above, when the middle FIFO memory 12 is saturated and the data is invalid, it is possible to prevent the slip phenomena by deleting the no-data code.

In the embodiment, the extracting/correcting circuit 502 corresponds to an extracting part, and the last FIFO memory 13, the middle FIFO memory 12, the first FIFO memory 11 correspond to a first memory, a second memory, and a third memory, respectively.

The data monitor protocol processing circuit 21 corresponds to a monitoring part, the data valid state determining circuit 22 corresponds to a data determining part, the no-data code generating circuit 23 corresponds to an invalid data generating part, the no-data code holding/determining circuit 26 corresponds to a no-data code determining part, and the data deleting FIFO memory 25 corresponds to a deleting part.

According to the present invention, in the data signal processing device, based on the storage information of the storing part storing the input data signal, the extracting part can recognize a difference between the input speed of the input signal and the speed of a synchronous clock. Therefore, it is possible for the extracting part to output the data signal in which the input signal from the storing part is processed in correspondence with the difference.

According to the present invention, by dividing the storing part into three divisions, it is possible for the extracting part to recognize an accumulation state required in an entire storing part by accumulation information of the second memory part. In addition, by changing a capacity of each of the first, the second, and the third memories, it is possible to determine a time difference between the failure of an output data signal and the cancellation of an input signal.

According to the present invention, since the invalid data signal is inserted into the data signals, it is possible to prevent the failure of the output data signal.

According to the present invention, since the invalid data signal included in the input data signal is deleted, it is possible to output the valid data signal with priority.

According to the present invention, the storage information of the input data signal is notified from the storing part. And the data determining part, in which the validity of data is notified from the monitoring part, instructs the invalid data generating part to generate the invalid data based on two notices and inserts the invalid data into the data signals. The two notices from the monitoring part are used to determine whether or not the data signal is the invalid data.

According to the present invention, the storage information of the input data signal is notified from the storing part. And the no-data code determining part, in which the validity of the data is notified from the monitoring part, instructs the deleting part to delete the invalid data based on two notices and the invalid data is deleted from the data signals. The two notices from the monitoring part are used to determine whether or not the data signal is the invalid data.

As described above, according to the present invention, it is possible to provide the device for processing data signals, a method thereof, and the device for multiplexing synchronized data signals, which can overcome a difference between the input speed of an input data signal and a clock speed of a synchronous clock and output the data signals.

The present invention is not limited to the specifically disclosed embodiments, variations and modifications, and other variations and modifications may be made without departing from the scope of the present invention.

The present application is based on Japanese Priority Application No.2001-260407 filed on Aug. 29, 2001, the entire contents of which are hereby incorporated by reference.

What is claimed is:

1. A device for processing data signals, comprising:
   a plurality of input interfaces each receiving an input signal; and
   a multiplexing circuit multiplexing a plurality of output signals from the plurality of input interfaces,
   wherein said each of the plurality of input interfaces comprises:
      a storing part storing the input signal; and
      an extracting part extracting data signals included in said input signal from said storing part and outputting said data signals to said multiplexing circuit,
      wherein said extracting part receives storage state information indicating an amount of data stored in said storing part from said storing part and outputs said data signals to said multiplexing circuit based on the amount of data indicated by the storage state information.

2. The device as claimed in claim 1, wherein:
   said storing part includes a first memory part, a second memory part, and a third memory part;
   said input signal is consecutively stored in an order of an arrangement of the first memory part, the second memory part, and the third memory part; and
   said second memory part signals said extracting part of said storage state information of said second memory part.

3. The device as claimed in claim 1, wherein when an empty release is notified from said storing part, said extracting part outputs said data signals, in which an invalid data signal is inserted to said input signal.

4. The device as claimed in claim 1, wherein when an empty release is notified from said storing part, said extracting part outputs said data signals in which an invalid data signal included in said input signal is deleted.

5. The device as claimed in claim 1, wherein said extracting part comprises:
   a monitoring part monitoring said data signals from said storing part;
   a data determining part determining said data signals based on a notice of said storage state information from said storing part and a notice of validity of said data signals from said monitoring part; and
   an invalid data generating part generating invalid data to insert into said input signal,
   wherein said invalid data generating part inserts said invalid data into said input signal in response to a determination notice from said data determining part.

6. The device as claimed in claim 1, wherein said extracting part comprises:
   a monitoring part monitoring said data signals from said storing part;
   a no-data code determining part determining a no-data code based on a notice of said storage state information from said storing part and a notice of validity of said data signals from said monitoring part; and
   a deleting part deleting said no-data code included in said input signal in response to a determination notice.

* * * * *